Figure 1:
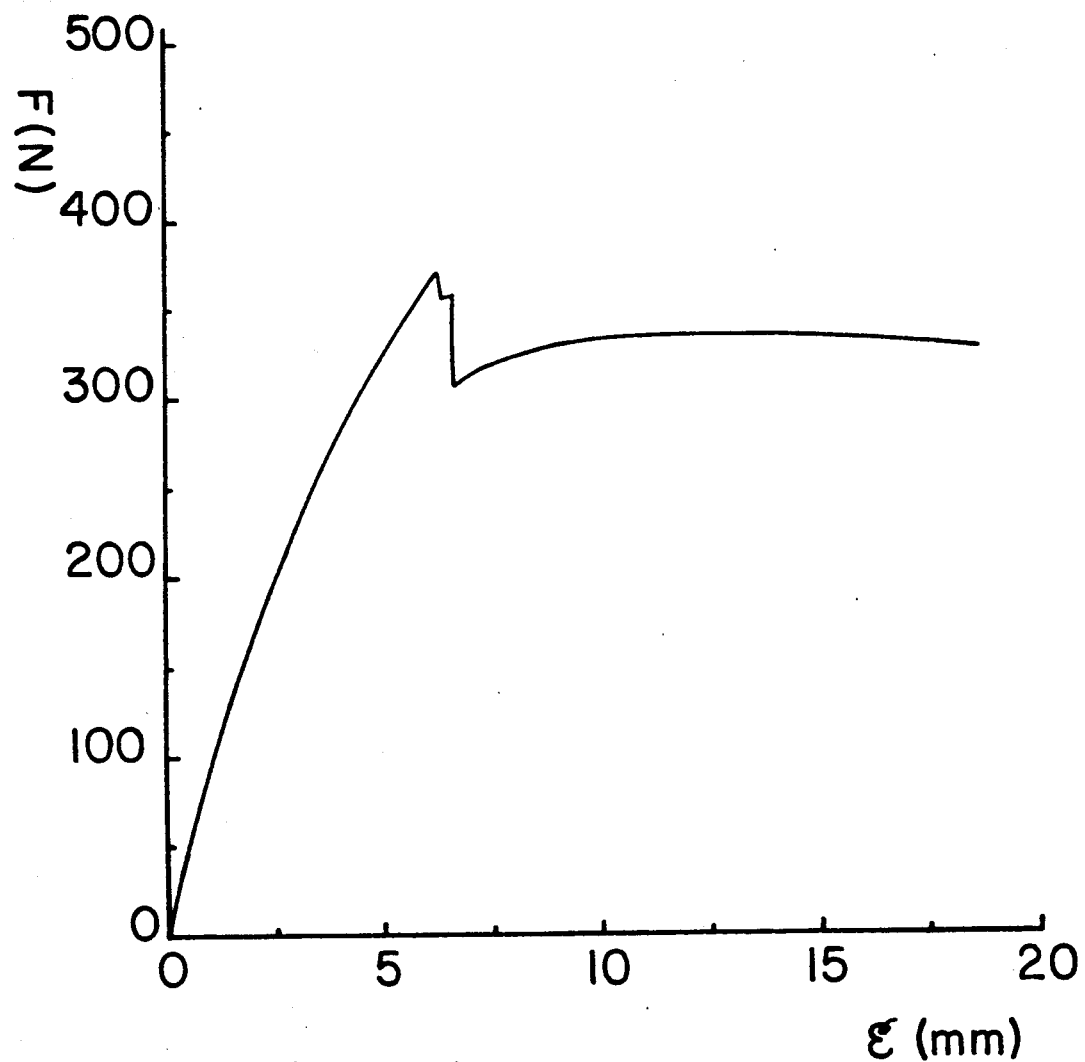

United States Patent [19]

Blanker et al.

[11] Patent Number: 5,194,321
[45] Date of Patent: Mar. 16, 1993

[54] REINFORCED VENEER LAMINATE CONSISTING OF AT LEAST ONE LAYER OF VENEER AND AT LEAST ONE LAYER COMPRISING POLYETHYLENE FIBRES

[75] Inventors: Eduard A. Blanker, Oirsbeek; Jacob Van der Stad, Eysden, both of Netherlands

[73] Assignee: Stamicarbon B.V., Geleen, Netherlands

[21] Appl. No.: 683,955

[22] Filed: Apr. 12, 1991

[30] Foreign Application Priority Data

Apr. 14, 1990 [NL] Netherlands ............... 9000892

[51] Int. Cl.⁵ .................. B32B 5/06; B32B 5/22
[52] U.S. Cl. .................. 428/252; 428/272; 428/302; 428/248; 428/249; 428/541; 428/902
[58] Field of Search .................. 428/252, 272, 302

[56] References Cited

U.S. PATENT DOCUMENTS

| 4,457,985 | 7/1984 | Harpell et al. | 428/911 |
| 4,623,574 | 1/1986 | Harpell et al. | 428/911 |
| 4,883,700 | 11/1989 | Harpell et al. | 428/911 |

FOREIGN PATENT DOCUMENTS

| 2042414 | 9/1980 | United Kingdom . |
| 1006399 | 10/1980 | United Kingdom . |
| 2050941 | 1/1981 | United Kingdom . |
| 2051667 | 1/1981 | United Kingdom . |
| 2071568 | 9/1981 | United Kingdom . |

OTHER PUBLICATIONS

European Search Report and Annex, Application No. EP 91 20 0850.

*Primary Examiner*—George F. Lesmes
*Assistant Examiner*—Kathryne E. Shelborne
*Attorney, Agent, or Firm*—Cushman, Darby & Cushman

[57] ABSTRACT

The invention relates to a reinforced veneer laminate comprising at least one layer of veneer and at least one layer of polyethylene filaments enveloped by resin and possessing a tensile strength of at least 1.2 GPa and a modulus of at least 30 GPA.

The reinforced veneer laminate bends very well and has a good resistance against static mechanical loads and mechanical impact loads.

8 Claims, 4 Drawing Sheets

REINFORCED VENEER LAMINATE CONSISTING OF AT LEAST ONE LAYER OF VENEER AND AT LEAST ONE LAYER COMPRISING POLYETHYLENE FIBRES

The invention relates to a reinforced veneer laminate comprising at least one layer of veneer and at least one layer of filaments enveloped by resin.

Such a reinforced veneer laminate is known from German patent specification 3012910. The reinforced veneer laminate disclosed in said patent specification comprises layers of veneer and layers from jute fibres, polyester filaments, polyamide filaments and the like, soaked in a urea and/or melamine resin. The known reinforced veneer laminate can be used for the manufacture of doors and partition walls that can withstand mechanical loads.

A drawback of the known reinforced veneer laminate is its low ability to bend, on account of which it can be used only for the manufacture of objects that are flat or have a very limited radius of curvature.

The invention provides a reinforced veneer laminate not having this drawback.

This is accomplished by using polyethylene filaments having a tensile strength of at least 1.2 GPa and a modulus of at least 30 GPa as filaments in the reinforced veneer laminate according to the invention.

A further advantage is that the reinforced veneer laminate according to the invention has a higher resistance to mechanical impact loads than the known reinforced veneer laminate.

Yet another advantage is that the reinforced veneer laminate according to the invention is better capable of withstanding static mechanical loads than the known reinforced veneer laminate.

Thus it is found, for instance, that the reinforced veneer laminate can be loaded far beyond the cracking limit. The cracking limit is the maximum deflection at which the reinforced veneer laminate retains its structure and even remains water-proof, though locally cracks may form in the veneer layers.

The reinforced veneer laminate according to the invention contains veneer layers that usually have a thickness between about 0.3 and 1.8 mm.

The reinforced veneer laminate according to the invention may have several embodiments. It may, for instance, consist of alternating layers of veneer and layers with the polyethylene filaments. The reinforced veneer laminate for instance comprises three layers of veneer alternating with two layers with the polyethylene filaments. A reinforced veneer laminate that is attractive as regards cost price and properties comprises four or more layers of veneer and two layers containing the polyethylene filaments, the latter adjoining the inner side of the two outer veneer layers of the reinforced veneer laminate. Thus, the layers with the polyethylene filaments are situated at those places in the reinforced veneer laminate where upon bending the greatest force buildup takes place.

A reinforced veneer laminate that is very attractive as regards cost price and properties comprises three or more layers of veneer and one layer with the polyethylene filaments, the latter adjoining the inside of one of the outer veneer layers of the reinforced veneer laminate. Such a reinforced veneer laminate can well be used in structures in which forces build up mainly on one outer side of the reinforced veneer laminate. In such applications it is, of course, important that the reinforced veneer laminate in the structure is placed so that the layer with the polyethylene filaments is on the side of the reinforced veneer laminate where the greatest force buildup takes place. In principle the reinforced veneer laminate may comprise any veneer type capable of being processed into layers of the required thickness. The veneer generally is formed by slicing round timber.

Various properties of the reinforced veneer laminate depend on the type of wood chosen. A very tough reinforced veneer laminate, for instance, will comprise ashwood or birch, while a veneer laminate with a high specific gravity will comprise beech. Good results are obtained if gaboon is chosen as wood.

In the reinforced veneer laminate according to the invention linear polyethylene preferably is used as polyethylene for the polyethylene fibre. Linear polyethylene is here understood to be polyethylene with less than 1 branch per 100 C atoms, and preferably with less than 1 branch per 300 C atoms, which may, in addition, contain up to 5 mol.% of one or more alkenes that are copolymerizable with it, such as propylene, butene, pentene, 4-methylpentene, octene.

Polyethylene filaments that are very suitable for the object of the invention are obtained if use is made of the gel drawing process described in, for instance, GB-A-2,042,414 and GB-A-2,051,667. This process essentially involves the preparation of a solution of the polyethylene, preferably having a weight average molecular weight of at least 600,000 g/mole, processing the solution into filaments at a temperature above the dissolution temperature, cooling of the filaments to below the dissolution temperature so that gelling takes place, and drawing of the gelled filaments while the solvent is removed. The filaments preferably have a tensile strength of at least 2 GPA and a modulus of at least 60 GPA. Filaments are here understood to be bodies of which the length is large compared with the height and the width. The filaments can be made into a yarn using the known processes. The yarns thus obtained can be processed into a fabric using the known processes.

A surface treatment may have been applied to the polyethylene filaments in order to increase their adhesion to substrates. Examples of surface treatments are corona, plasma or oxidative chemical treatments.

Fabrics that are very suitable for the object of the invention possess an open structure. In a fabric with an open structure there is some space between successive yarns in the fabric. Good results are obtained if at least 5% of the fabric's surface area consists of such open spaces. In principle the fabric may have any fabric structure. It even is possible to use a layer of parallel yarns instead of a fabric.

The fabric or the layer of parallel yarns can be soaked in a thermosetting resin using known processes. In doing this, it is important that the setting temperature of the resin is below the melting point of the filaments and that the resin is capable of forming a solid bond with the veneer in the reinforced veneer laminate.

Resins that may be used include unsaturated polyester resin, polyurethane resin and epoxy resin, the last resin being preferred.

It is preferred to use a resin which after curing has an elongation at rupture of at least 2%.

The fabric soaked in the resin or the layer of yarns soaked in the resin is stacked into a packet together with the veneer formed by one of the known methods. Using one of the known methods the packet is formed into the reinforced veneer laminate under elevated pressure and temperature.

It also is possible to glue the reinforced veneer laminate together with a non-reinforced veneer laminate yielding a composite reinforced veneer laminate consisting of one or more layers of the reinforced veneer laminate and one or more layers of the non-reinforced veneer laminate.

The reinforced veneer laminate and the composite reinforced veneer laminate are very suitable for use in, for instance, a boat's skin or deck, the skin of a glider plane, a suitcase or shuttering for concrete work.

The reinforced veneer laminates also are highly suitable for processing in sandwich constructions that are applied in, for instance, the superstructure of a lorry or a boat.

The invention will be elucidated on the basis of the example, without being restricted thereto.

Figure 2:
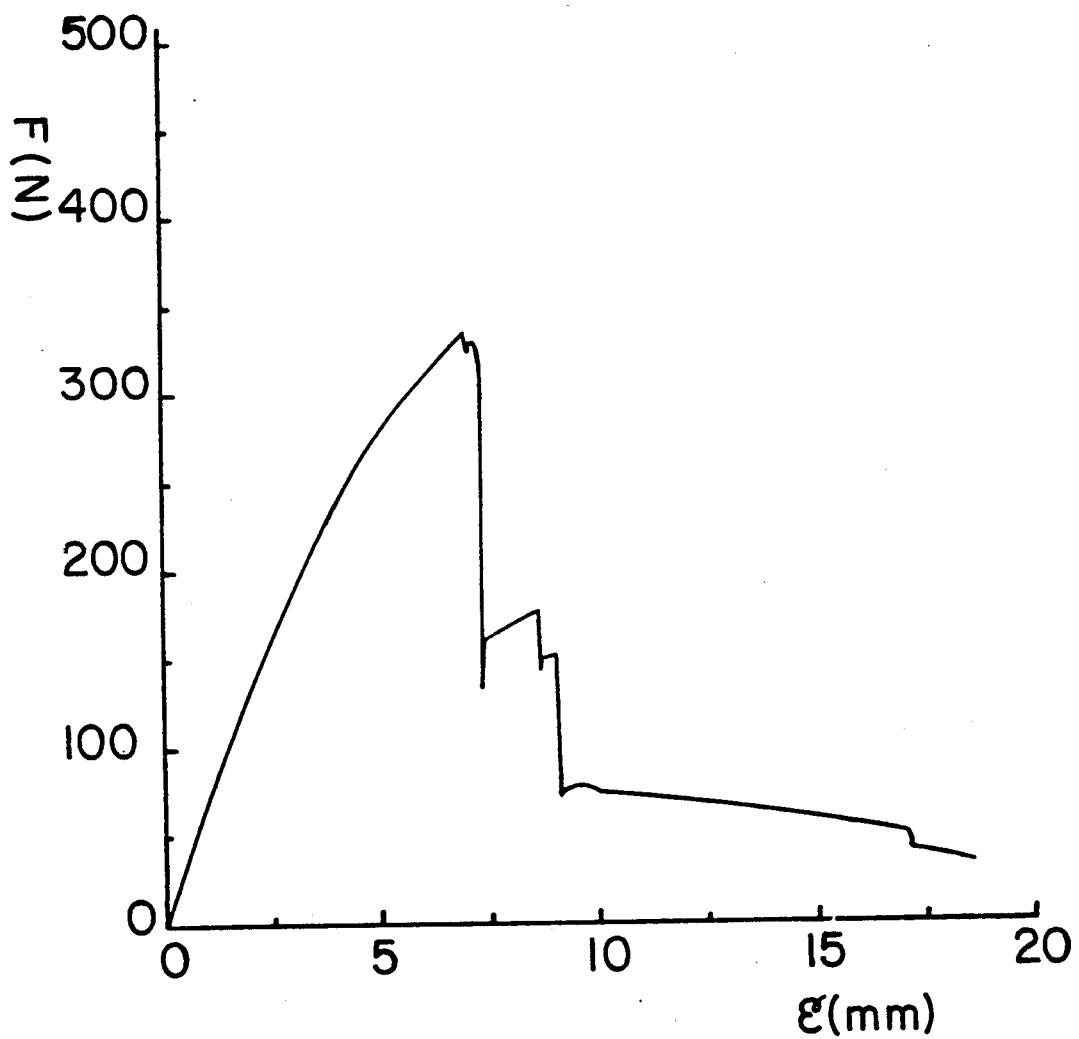
Figure 3:
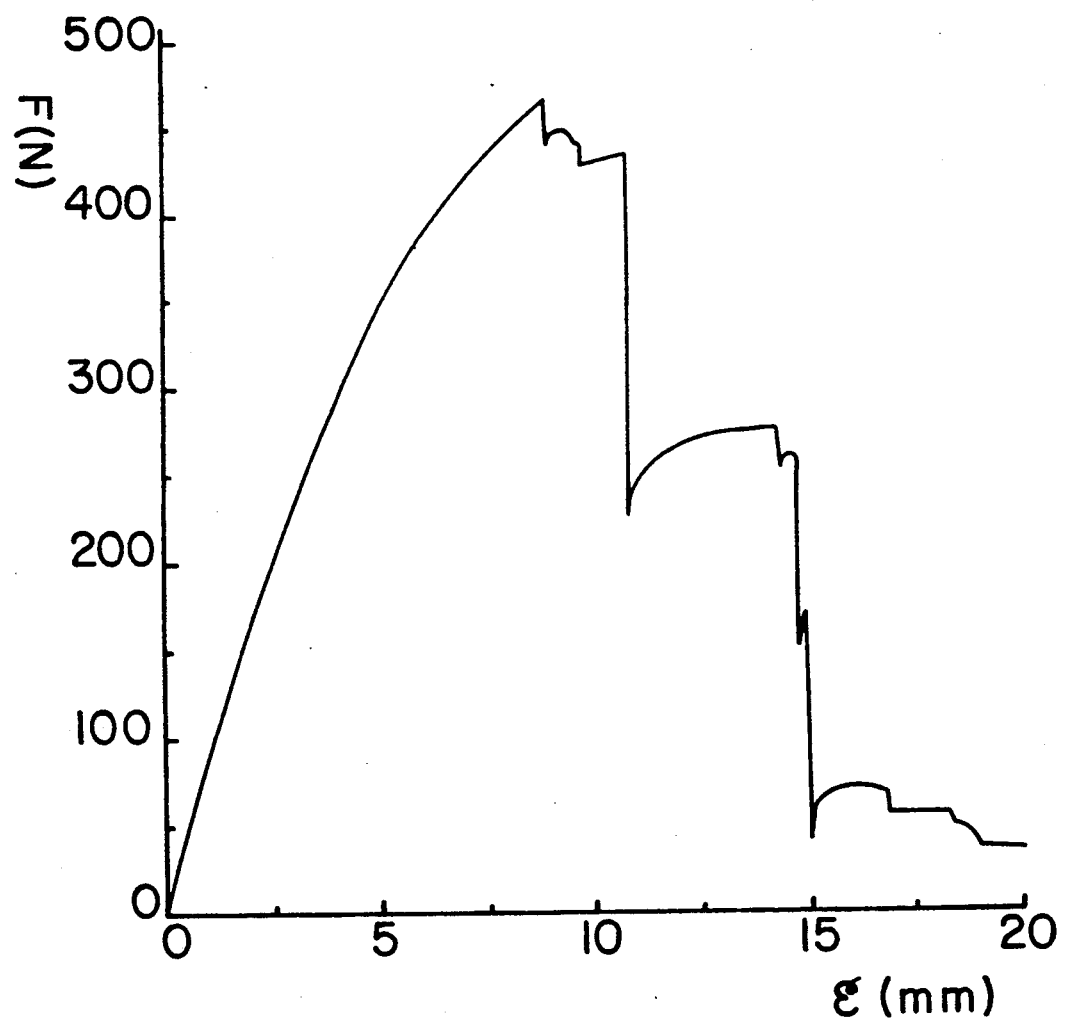

In the drawing:

FIG. 1 is a graphic representation of the force buildup as a function of flexure, measured on the sample from Example II, which contains polyethylene filaments, FIG. 2 is a similar representation, measured on the sample of comparative experiment B, which does not contain filaments, FIG. 3 is a similar representation measured on the sample from comparative experiment C, which contains Kevlar 49 filaments.

Figure 4:
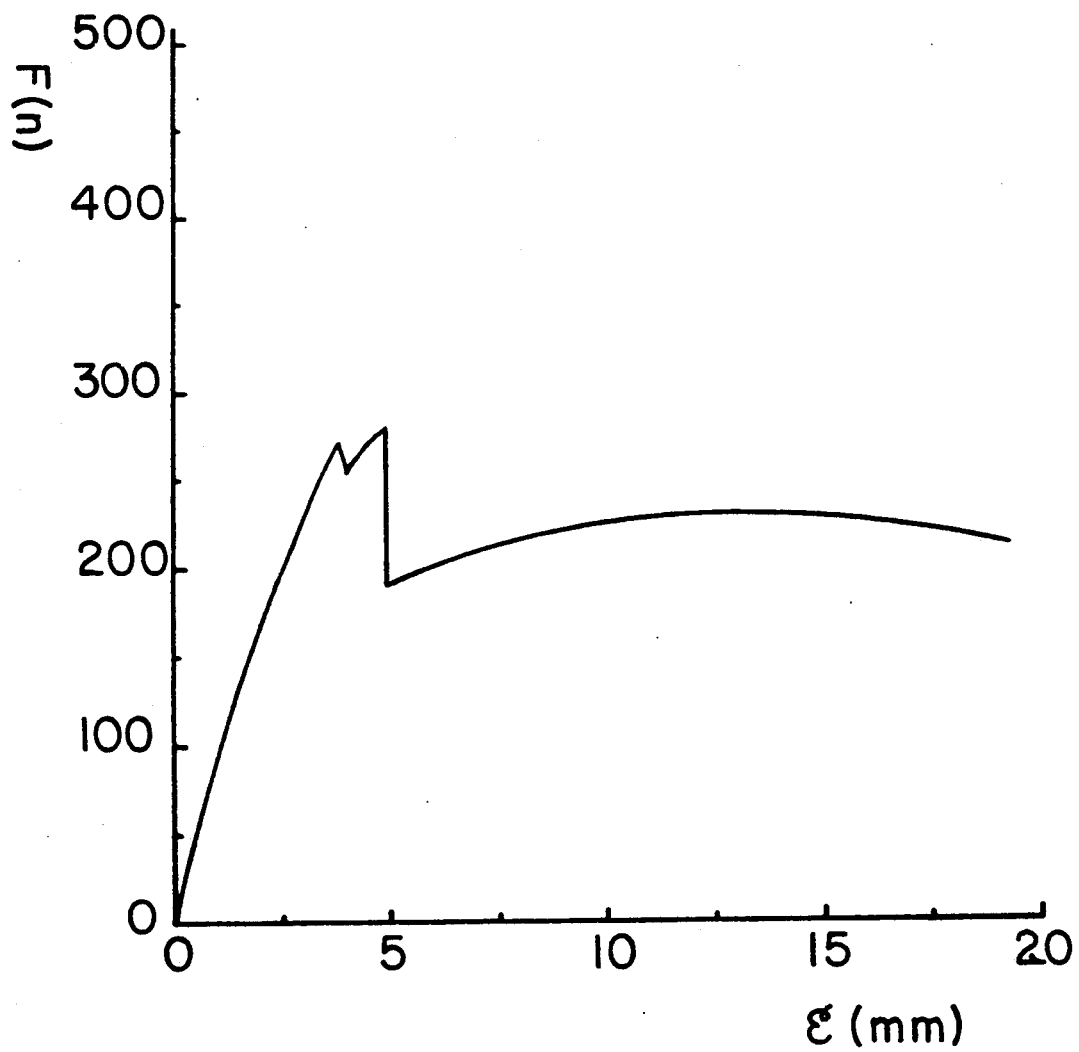

FIG. 4 is a similar representation measured on the sample from comparative experiment D, which contains polypropylene filaments.

EXAMPLE I

From a 800 denier Dyneema ® SK 60 yarn a plain-woven fabric is made. The warp of the fabric incorporates 8 and the weft 6 yarns per linear cm. The fabric weight is 130 g/m$^2$.

Dyneema ® SK 60 is a high-strength, high-modulus and ultra-high-molecular weight polyethylene yarn marketed by HPF, a subsidiary of DSM. The fabric is soaked in a resin at 60° C., so that 250 g of resin is applied per m$^2$ of fabric. The resin is a mixture of 100 parts by weight of Eurepox ® 730 and 5 parts by weight of TY 1910 H, both from Sheering AG. The fabric with the resin is then cooled and stacked into a packet with layers of gaboon veneer of 0.6 mm thick. The packet is built up as follows: 1 layer of gaboon with the veneer fibre in the packet's longitudinal direction (LD), 1 layer of fabric with resin, 1 layer of gaboon with the wood fibre running in the transverse direction (TD), 1 layer of fabric with resin, 1 layer of gaboon LD. The packet is compressed for 1 hour at 100° C. and 4 bar, yielding a reinforced veneer laminate. The reinforced laminate can without any problems be bent in a radius of 20 mm at an angle of 180°.

COMPARATIVE EXPERIMENT A

A reinforced veneer laminate that does not contain the fabric but otherwise has the same composition as the reinforced veneer laminate of Example I breaks when it is bent in a radius of 100 mm at an angle of 180°.

EXAMPLE II

A composite veneer laminate is obtained by glueing the reinforced veneer laminate of Example I layer by layer with two non-reinforced veneer laminates of comparative example A. The wood glue used is chosen at random.

The direction of orientation and the distribution of the reinforced and the non-reinforced veneer laminate are as follows: the first layer is reinforced veneer laminate with a direction of orientation of 0°, the second layer is a non-reinforced veneer laminate with a direction of orientation of +45°, and the third layer is a non-reinforced veneer laminate with a direction of orientation of −45°. From the composite reinforced veneer laminate thus obtained a sample measuring 30×150 mm is taken. The sample is subjected to a three-point bending test using a Zwick ® tensile tester. The test span is 90 mm. The reinforced veneer laminate is at the side of the sample that is subjected to a tensile load. The force buildup F as a function of the strain $\epsilon$ is presented in FIG. 1. This figure shows that at 7 mm strain a slight decrease in force buildup does take place, probably due to local rupture phenomena, but the force buildup in the sample is retained up to at least $\epsilon$=20 mm.

COMPARATIVE EXPERIMENT B

A sample that does not contain the fabric while otherwise having the same composition and dimensions as the sample of Example II is subjected to a bending test as described in Example II. The force buildup F as a function of the strain $\epsilon$ is shown in FIG. 2. As is apparent from FIG. 2, in the sample without the fabric the force buildup is not retained at a strain above 7 mm, so that the sample has lost its strength, in contrast to the sample of Example II, which does contain the fabric.

COMPARATIVE EXPERIMENT C

A sample comprises a fabric on the basis of Kevlar ® 49 yarn, otherwise having the same shape and composition as the sample of Example II. Kevlar 49 yarn is a yarn on the basis of polyaramide filaments supplied by Dupont.

Kevlar 49 yarn has a titre of 128 tex. The fabric contains 6.5 yarns per linear cm in teh warp and the weft directions. Its surface density is 170 g/m$^2$.

The sample is tested as described in Example II. The force buildup F as a function of the strain $\epsilon$ is presented in FIG. 3, showing that at a relative low strain there is a considerable force buildup in the sample, but at higher strain the sample breaks completely. Evidently, a reinforced veneer laminate comprising Kevlar 49 filaments does not yield the good results of the reinforced veneer laminate according to the invention.

COMPARATIVE EXPERIMENT D

A sample comprises a fabric on the basis of polypropylene, designated as Nicolon ® 66786, delivered by ten Cate, the Netherlands, having a plain weave structure and a surface density of 250 g/m$^2$. The sample has otherwise the same shape and structure as the sample of Example II. The sample was tested as described in Example II. The force build up as a function of the strain $\epsilon$ is presented in FIG. 4, showing that unless the fact that the polypropylene fabric contains twice as much material as the polyethylene fabric of Example II the force build up is at a considerable lower level.

We claim:

1. Reinforced veneer laminate having a high tensile strength and being load bearing beyond the cracking limit consisting essentially of:

at least one layer of veneer; and at least one layer of polyethylene filaments enveloped by resin, said polyethylene filaments having a tensile strength of at least 1.2 GPa and a modulus of at least 30 GPa.

2. Reinforced veneer laminate according to claim 1, wherein the reinforced veneer laminate comprises four or more layers of veneer and two layers containing the polyethylene filaments, the latter layers adjoining the inner side of the two outer veneer layers of the reinforced veneer laminate.

3. Reinforced veneer laminate according to claim 1, wherein the reinforced veneer laminate comprises three or more layers of veneer and one layer containing the polyethylene filaments, the latter layer adjoining the inner side of one of the outer veneer layers of the reinforced veneer laminate.

4. Reinforced veneer laminate according to claim 1, wherein linear polyethylene is used as polyethylene.

5. Reinforced veneer laminate according to claim 1, wherein the polyethylene filaments have been prepared by the gel drawing process.

6. Reinforced veneer laminate according to claim 1, wherein the polyethylene filaments form an open structure.

7. Composite reinforced veneer laminate obtained by glueing at least one reinforced veneer laminate according to any claim 1 with at least one non-reinforced veneer laminate.

8. Reinforced veneer laminate according to claim 1, wherein the resin has an elongation at break of at least 2%.

* * * * *